Figure 1:
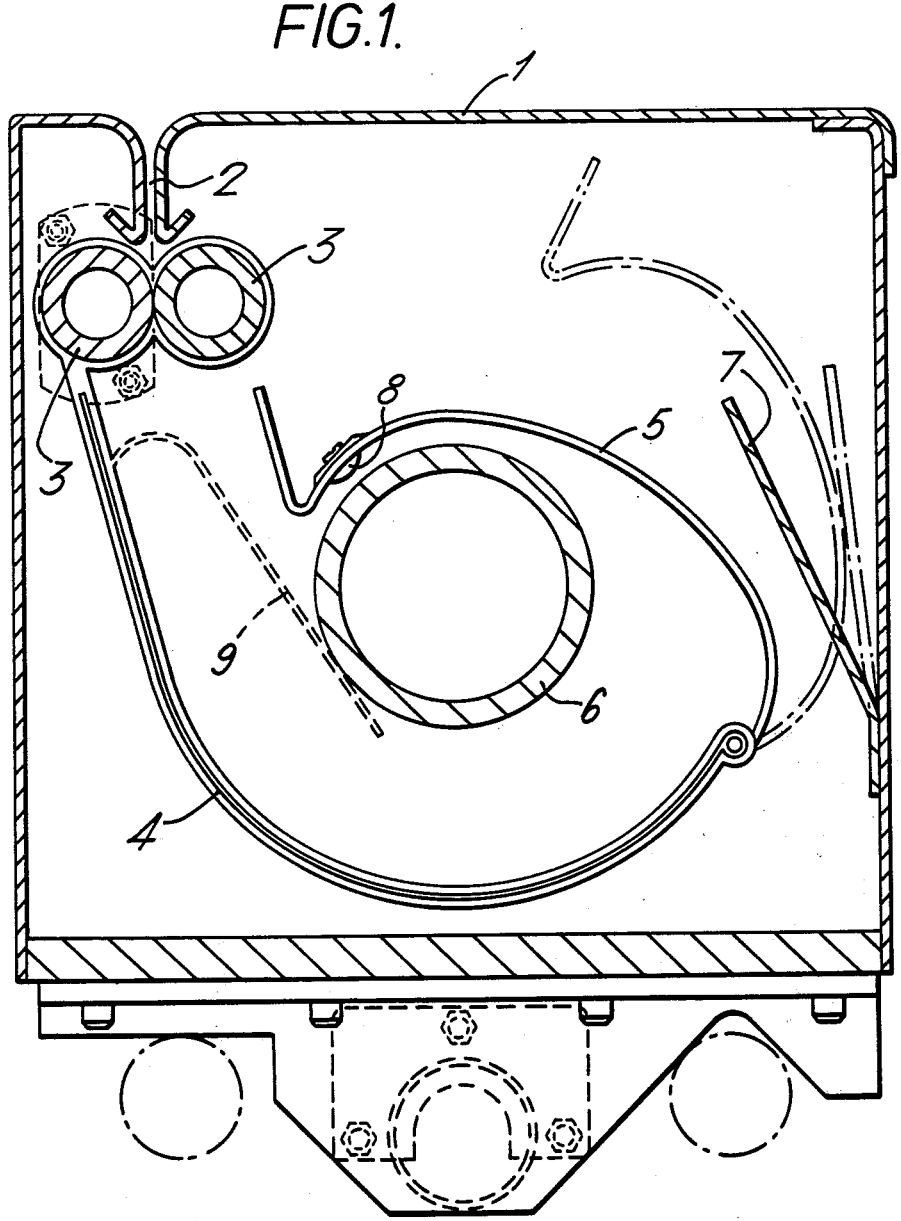

United States Patent [19]

Norris

[11] 4,060,210
[45] Nov. 29, 1977

[54] TAKE-UP SPOOLS
[75] Inventor: John Henry Norris, Beaconsfield, England
[73] Assignee: Linotype-Paul Limited, England
[21] Appl. No.: 695,812
[22] Filed: June 14, 1976
[30] Foreign Application Priority Data
Feb. 13, 1976  United Kingdom ............... 5844/76
[51] Int. Cl.² .............................................. G03B 1/04
[52] U.S. Cl. .................................................. 242/71.1
[58] Field of Search ............... 242/71.1, 71.7, 71, 242/67.1 R, 67.2, 76; 352/75, 76, 77, 78

[56] References Cited
U.S. PATENT DOCUMENTS

| | | | |
|---|---|---|---|
| 877,454 | 1/1908 | Randall | 242/71.1 X |
| 2,205,052 | 6/1940 | Stein | 242/71.7 |
| 3,322,366 | 5/1967 | Hayden | 242/71.1 |
| 3,395,870 | 8/1968 | Klinger | 242/76 |
| 3,743,200 | 7/1973 | Hommerin | 242/71.7 |

Primary Examiner—Edward J. McCarthy
Attorney, Agent, or Firm—Hill, Gross, Simpson, Van Santen, Steadman, Chiara & Simpson

[57] ABSTRACT

A mechanism for automatically taking up film strip material on to a driven spool comprises a fixed guide to direct the film around the spool, and a pivotally-mounted guide for directing the film back on to itself so the leading end is entrained between the spool and a remote portion of the film. The mechanism is contained within a cassette having an inlet slot for directing the film through nip rollers to the fixed guide.

14 Claims, 2 Drawing Figures

TAKE-UP SPOOLS

This invention relates both to a method of automatically taking-up strip material onto a spool and to such an automatic take-up spool and mechanism therefor. It is related especially, but not exclusively, to photographic film take-up on spools for use in cassettes incorporated in phototypesetting equipment.

In accordance with one aspect of the present invention, there is provided a mechanism for automatically taking up strip material to be wound on a spool, comprising a take-up spool and means for guiding the strip thereto, said guide means being disposed about the spool and shaped such that the leading end of the strip is guided around the spool and gripped between the spool and a remote portion of the strip.

In accordance with a further aspect of the invention there is provided a cassette for automatically taking up strip material, the cassette having an inlet slit through which strip material can be passed to a mechanism in accordance with the said one aspect of the invention.

In accordance with a still further aspect of the invention, there is provided a method of automatically winding strip material on to a spool, wherein the strip is directed towards the spool and is guided therearound such that its leading edge is entrained between the spool and a remote portion of the strip.

In order that the invention may be more fully understood, a photographic film cassette for incorporation in a phototypesetting machine and employing three preferred forms of an automatic take-up mechanism in accordance with the invention will now be described by way of example and with reference to the accompanying drawings which show two partial cross-sectional side views of the cassette.

Referring to FIG. 1, a cassette housing 1 comprises a photographic film inlet slot 2 in its top wall. A pair of fully-rotatable nip rollers 3 are located substantially immediately below the slot 2 to provide a light-tight seal for the cassette. Each roller 3 has a running surface of a synthetic rubber material whose resilience allows for the thickness of the film to be fed therebetween yet at the same time prevents light from entering the cassette. A fixed guide 4 is supported below the rollers 3 to guide the end of the film (not shown) when fed through the slot 2 and between the rollers towards a further guide 5.

The guide 5 partially encircles a take-up spool 6 and is pivoted in the housing 1 on a pin 10 to the guide 4 to allow for the increasing diameter of the wound film being taken-up on the spool 6. A spring metal strip 7 is secured to a side wall of the housing 1 and is engaged by the guide 5 when the latter is pivoted out to a predetermined position thereby acting on the guide 5 to ensure this engages the film wound upon the spool 6. However, the main purpose of the pivotable guide 5 is to guide the end of a photographic strip film, which has been fed into the cassette housing, around the rotating spool 6 so that the end is gripped between the spool and the fed film. Once this automatic take-up has been performed, the tension of the winding-on film lifts the film away from the fixed guide portion 4 so that the film is no longer required to be pushed through the slot 2 and between the nip rollers 3 but is pulled therethrough directly onto the the wound film by the rotation of the spool.

Although each roller 3 has a synthetic rubber running surface, this surface may be made of any material as long as it allows for the thickness of the film to be fed between the rollers and prevents light from entering the cassette.

The winding surface of the spool 6 comprises alternate axially-extending rubber and metal portions, the rubber portions providing the necessary frictional forces to grip and take-up the end of the film. The pivotable guide 5, when comprising at least one short portion, engages a respective metal portion of the spool. Stops 8 are provided at each end of the or each guide 5 beyond the width of the film to be taken-up so that, when no film is wound on the spool 6 and the latter is rotated, the guide 5 does not engage the rubber portions of the spool surface. Thus jamming of the spool due to friction between the guide 5 and the rubber portions is minimised. The stops 8 are preferably made of a low-friction plastics material, such as Nylotron (Registered Trade Mark). The fixed guide 4 preferably extends along substantially the whole length of the spool 6, however, it may comprise at least one short portion which extends along a much shorter portion of the spool length. Similarly, the pivotable guide 5 may be of similar length to the fixed guide 4.

A length of foil (not shown), preferably of a plastics material, may be positioned on the fixed guide 4 to extend across the hinge connecting the guides 4 and 5. This prevents the free end of the fed film from catching on the hinge and, thus, prevents the cassette from having to be dismantled to release the caught film end. Alternatively, the hinge may be designed so that it lies flush with the two guides 4 and 5, thereby also preventing the fed film end from becoming caught.

In a second embodiment of the invention, there is provided a spring 9 which is substantially straight but has an arcuate end which is secured to the end of the guide 4 adjacent the nip rollers 3 so that its other end is biassed against the spool 6 or the film wound thereon. As shown in the drawing, the spring 9 supplements the guide 4, in that the leading edge of the film is directed firstly along the spring 9 and then on to the guide 4. The curvature of the fixed end of the spring 9 causes the spring to press against the film already wound on the spool 6. This pressure ensures that when the incoming film is severed outside the cassette 1 from the rest of the film coming from the phototypesetting machine, it does not drop into the cassette. The cassette 1 thus does not need to be opened to retrieve the film for processing.

Figure 2:
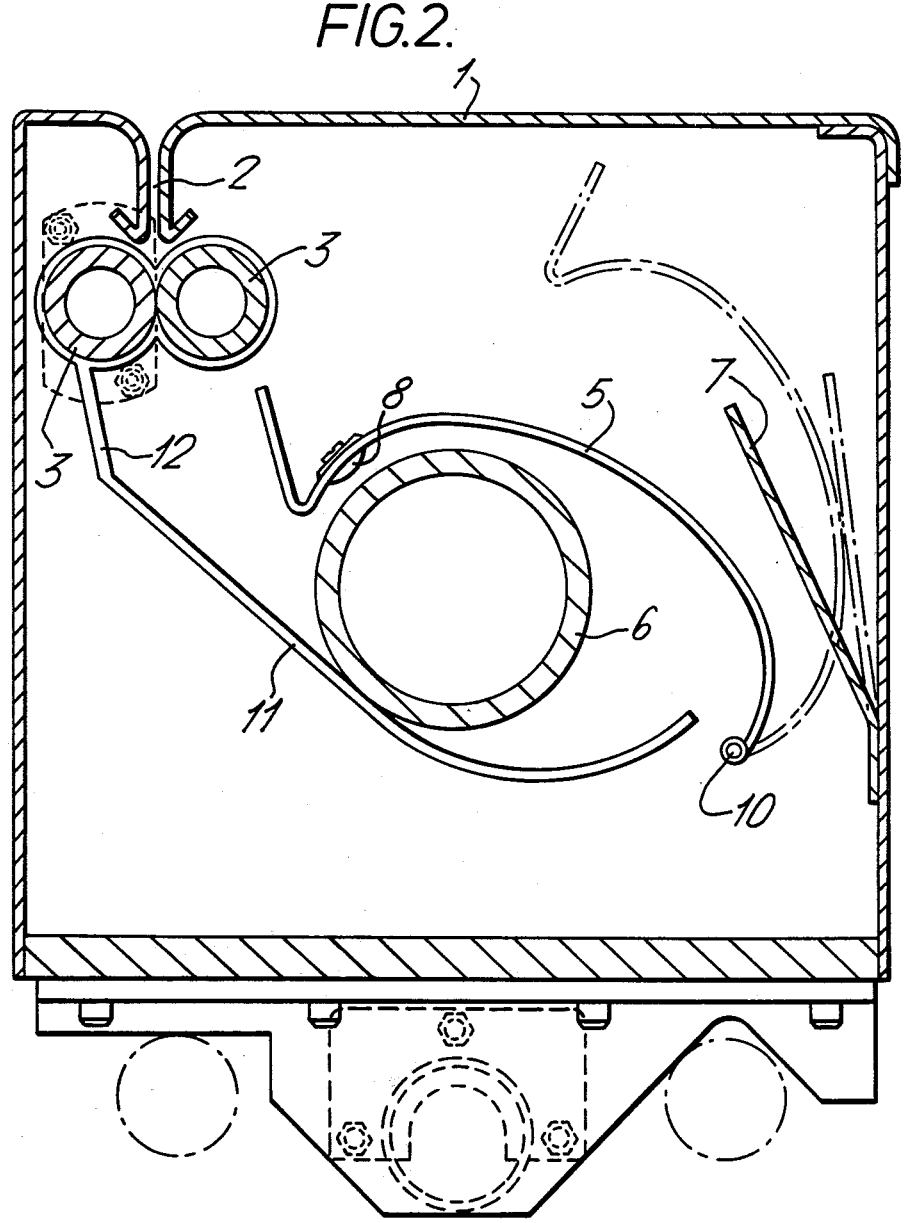

In an alternative arrangement shown in FIG. 2, a spring 11 is secured at one end to a support 12, and the guide 5 alone is attached to the pivot pin 10 i.e. the spring 11 in this arrangement replaces the fixed guide 4. The spring 11 guides the film towards the spool 6 and retains it at the point of contact, as does the spring 9. However, the free end of the spring 11 is curved about the spool 6 so as further to direct the leading edge of the film towards the pivoted guide 5. Furthermore, it is envisaged that the free end of the spring 11 could be curved further around the spool 6 so that the guide 5 could also be dispensed with.

The spool 6 is so mounted in the cassette that, when the wound film is to be removed from the cassette, it is freely rotatable in the reverse winding direction to enable the film to be unwound easily from the spool.

Although the end of the photographic film strip is fed into the cassette by means not shown in the drawing and the rollers 3 are described as being freely rotatable, such a feed means may be constituted by the rollers which, in this case, would have to be rotated by, for instance, a motor.

The housing 1 is detachably mountable within a phototypesetting machine and may be matt black-finished inside and out.

I claim:

1. A mechanism for automatically taking up strip material to be wound on a spool, comprising a take-up spool, a fixed rigid guide member arranged, in use, to guide said strip material to and around said spool, and a pivotally mounted guide member arranged, in use, to guide said strip material from said fixed guide member around said take-up spool such that the leading end of said strip is gripped between said spool and a remote portion of said strip.

2. A mechanism according to claim 1, wherein said pivotally mounted guide member is pivotable about one end of said fixed guide member.

3. A mechanism according to claim 1, further comprising a resilient guide member that is arranged, in use, to urge said strip material against said take-up spool.

4. A mechanism according to claim 3, wherein said resilient guide member is mounted at one end on said rigid guide member.

5. A mechanism according to claim 4, further comprising means for biasing said pivotably mounted guide member towards said take-up spool.

6. A cassette for automatically taking up strip material, the cassette having a wall defining an inlet slit through which strip material can be passed to a mechanism in accordance with claim 1.

7. A cassette according to claim 6, further comprising a pair of rollers mounted internally adjacent the said slit, for directing the strip material to the fixed guide member.

8. A cassette according to claim 6 for use as a photographic film cassette, wherein said inlet slit is light-tight.

9. A mechanism for automatically taking up strip material to be wound on a spool, comprising a take-up spool, and guide means arranged, in use, to guide said strip material around said spool such that the leading end of said material is gripped between the spool and a remote portion of the strip, said guide means comprising a fixed rigid guide member and a movable guide member, each of said members being curved about said spool with said movable guide member being mounted for pivotal movement about one end of said fixed guide member.

10. A mechanism according to claim 9, further comprising a resilient guide mounted on said fixed guide near another end thereof and is arranged, in use, to urge said strip material against said take-up spool.

11. A mechanism for automatically taking up strip material to be wound on a spool, comprising a take-up spool, a resilient guide member fixed at one end and arranged, in use, to guide and bias said strip material to and around said spool, and a pivotally mounted guide member arranged, in use, to guide said strip material from said resilient guide member around said take-up spool such that the leading end of the strip is guided around the spool and gripped between the spool and a remote portion of the strip.

12. A cassette for automatically taking up strip material, the cassette having a wall defining an inlet slit through which strip material can be passed to a mechanism in accordance with claim 11.

13. A cassette according to claim 12, further comprising a pair of rollers mounted internally adjacent the said slit, for directing the strip material to the fixed guide member.

14. A cassette according to claim 11 for use as a photographic film cassette, wherein said inlet slit is light-tight.

* * * * *